Feb. 9, 1954   O. H. BANKER   2,668,453
TRANSMISSION
Filed Oct. 5, 1950   3 Sheets-Sheet 1
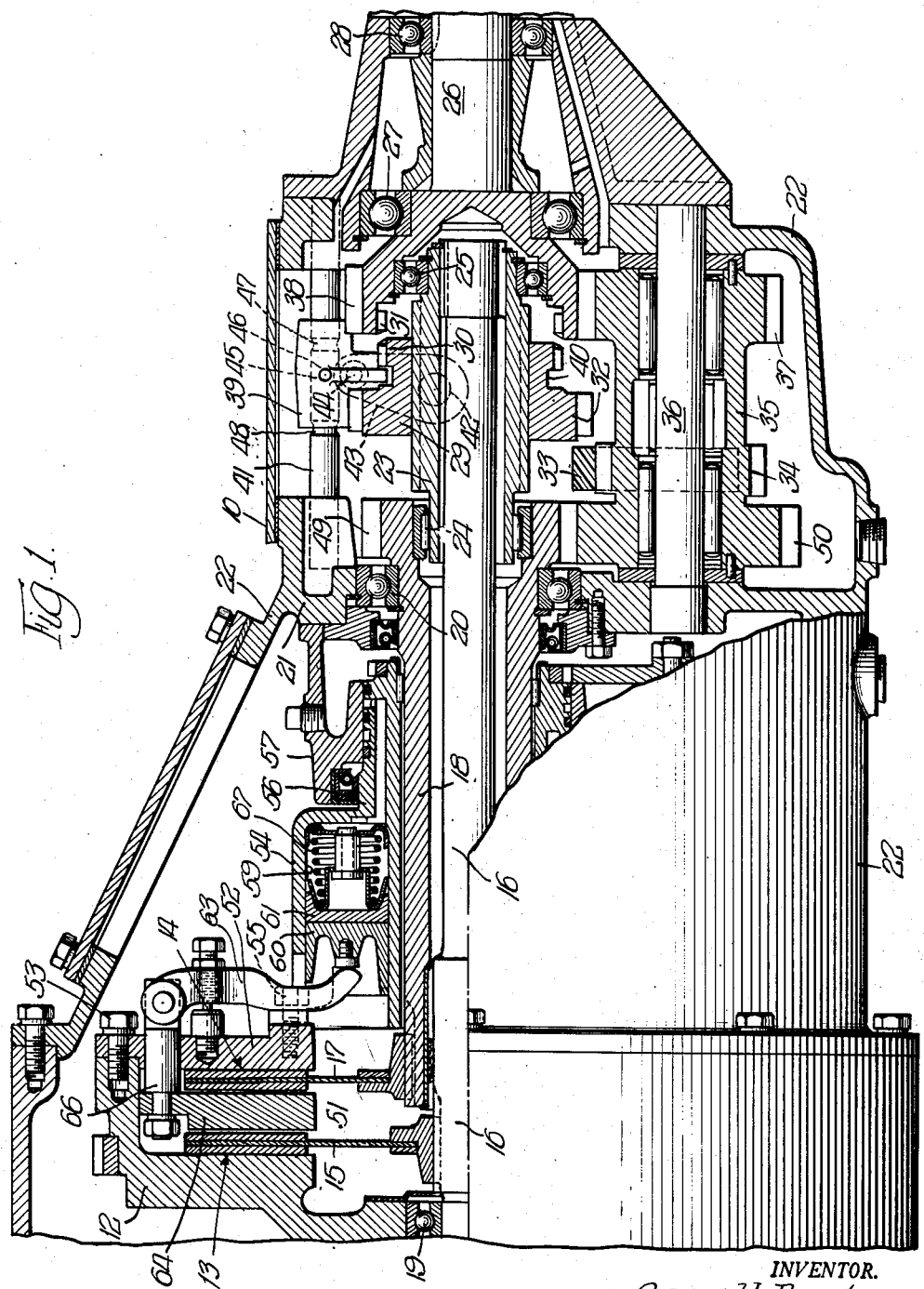
INVENTOR.
Oscar H. Banker,
BY
Cromwell, Greist & Warden
Attys.

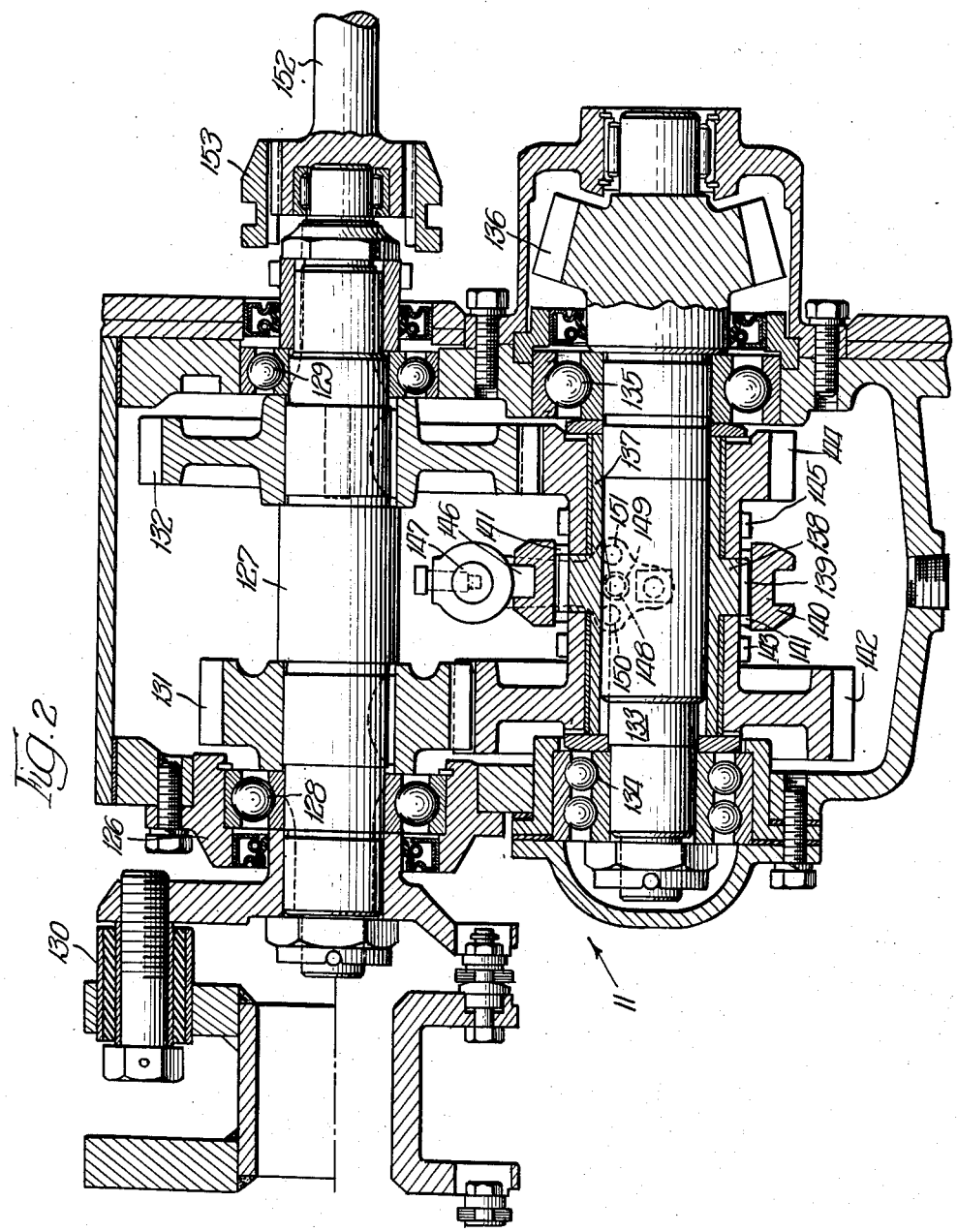

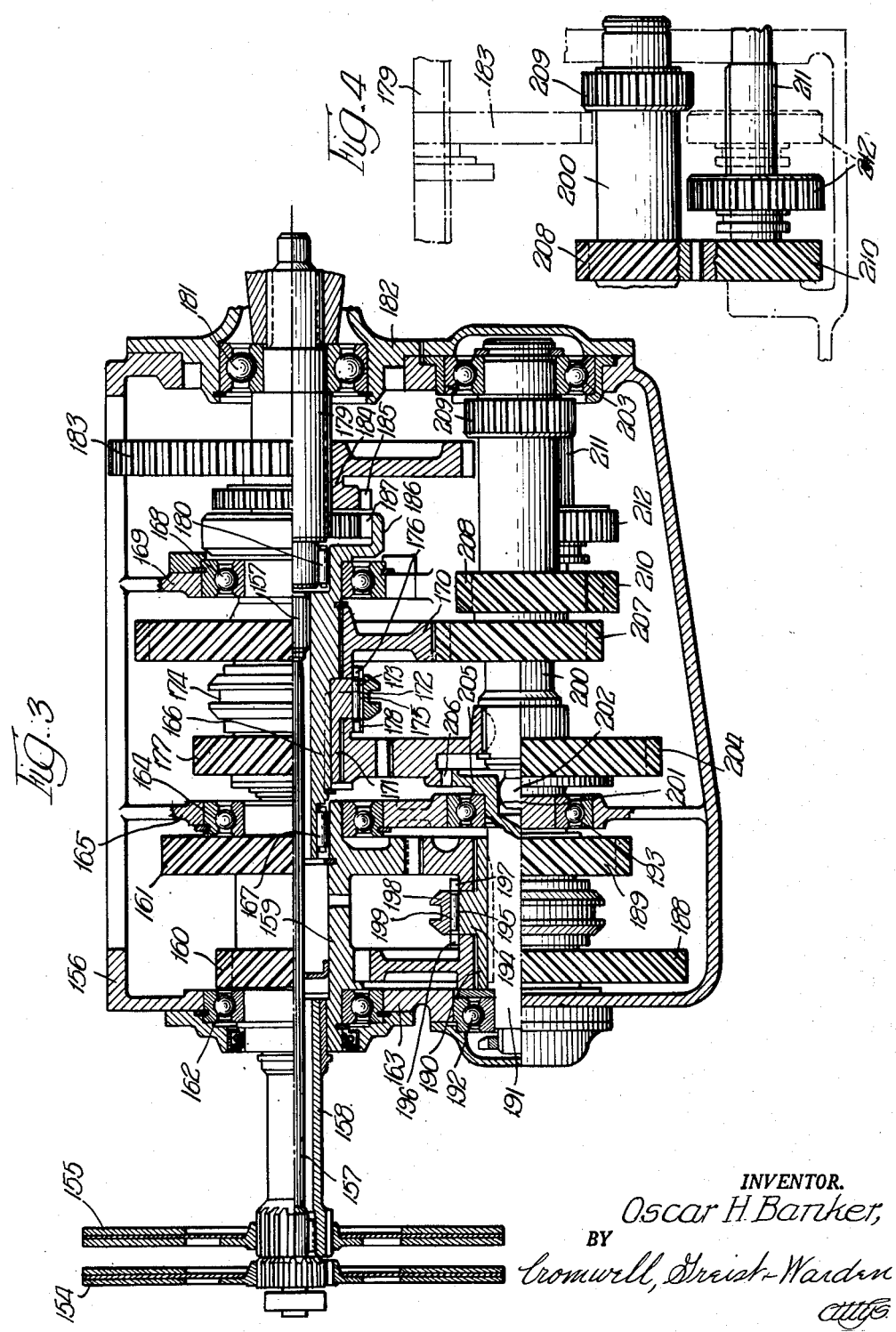

Patented Feb. 9, 1954

2,668,453

UNITED STATES PATENT OFFICE 2,668,453

TRANSMISSION

Oscar H. Banker, Evanston, Ill., assignor to New Products Corporation, Chicago, Ill., a corporation of Delaware Application October 5, 1950, Serial No. 188,631

10 Claims. (Cl. 74—330)

This invention has to do with automotive transmissions.

One object of the invention is to provide an improved transmission in which shifting from one gear ratio to another can be accomplished without appreciable interruption in the delivery of torque by the transmission.

Another object is to provide an improved transmission which is particularly well suited for heavy bulldozing work and can be operated rapidly back and forth between a very low or crawler forward gear ratio and a relatively fast reverse gear ratio with but a simple clutch manipulation and without any shifting of gears.

Other more specific objects and advantages of the invention will be apparent to those skilled in the art upon a full understanding of the construction, arrangement and operation of the new transmission.

While the hydraulic clutch control features of the invention are especially applicable to dual clutches, certain of such features can be incorporated advantageously in single clutch transmissions and other mechanisms.

Two embodiments of the invention are presented herein by way of explanation but it will of course be appreciated that the invention is susceptible of incorporation in other structurally modified forms coming equally within the scope of the appended claims.

In the accompanying drawings,

Fig. 1 is a vertical longitudinal section through a hydraulic clutch control constructed in accordance with the invention, showing the control applied to the front unit of a two-unit transmission;

Fig. 2 is a vertical longitudinal section through the rear unit of the two-unit transmission;

Fig. 3 is a vertical longitudinal section through another form of transmission equipped with the hydraulic clutch control; and Fig. 4 is a fragmentary view of the rear section of the jack shaft in this transmission showing the reversing shaft which is located at one side of the jack shaft.

The control means of the present transmission is the subject matter of my Patent No. 2,485,638 of October 25, 1949. It is shown sufficiently in Fig. 1 for an understanding of the present invention as applied to the front unit 10 of the variable speed transmission which is the subject of that invention. This transmission includes, in addition to the front unit 10, a rear unit 11 (Fig. 2) which operates in conjunction with the front unit to provide four speeds in forward and two in reverse.

The front unit 10 is adapted to be connected with the flywheel 12 of an associated motor through either one of two hydraulically operated friction clutches 13 and 14 (Fig. 1).

The clutch 13 includes a driven clutch plate 15 which is splined on the front end of a shaft 16, while the clutch 14 includes a driven clutch plate 17 which is splined on the front end of a shaft 18. The driven plates 15 and 17 may be of any suitable construction. The shaft 16 on which the driven plate 15 is mounted is positioned in axial alignment with the flywheel 12 and is journaled at its front end in a bearing 19 carried by the flywheel (not shown). The shaft 18 on which the driven plate 17 is mounted is tubular in form and is sleeved over the shaft 16. The rear end of the shaft 18 is journaled in a bearing 20 which is mounted in a vertical partition 21. The partition 21 is located in a casing 22 and extends transversely of the latter. The clutches 13 and 14 and the means for controlling the operation of the same are housed in the casing 22 in front of the partition 21, while the gearing which constitutes the front unit 10 of the transmission and the hereinafter described means for shifting the same are housed in the casing 22 behind the partition 21.

Complete details of the clutches and control means are illustrated and described in my above identified Patent No. 2,485,638, hence will be but briefly referred to herein.

A sleeve 23 is fixedly secured to the rear end of the shaft 16. The front end of the sleeve 23 is journaled in a bearing 24 which is mounted in a recess in the rear end of the shaft 18, while the rear end of the sleeve 23 is journaled in a bearing 25 which is mounted in a recess in the front end of a rearwardly extending shaft 26. The shaft 26 is journaled in the casing 22 in bearings 27 and 28, in axial alignment with the concentrically associated shafts 16 and 18.

An axially shiftable collar 29 is splined on the sleeve 23 and is provided at its rear end with a small jaw clutch 30. When the collar 29 is shifted rearwardly the clutch 30 is adapted to clutch non-rotatably within a complementary internal clutch 31 formed on the front end of the shaft 26. The collar 29 is also provided at its front end with a relatively large gear 32. When the collar 29 is shifted forwardly the gear 32 is adapted to mesh with a reversing idler gear 33, which reversing gear is mounted on a shaft (not shown) and is arranged in constant mesh with a gear 34 formed on an elongated hub 35. The hub 35 is journaled on a shaft 36 which is fixedly mounted at its front end in the partition 21 and at its rear end in the rear wall of the casing 22. The hub 35 is provided at its rear end with a second gear 37 which meshes with a gear 38 formed on the front end of the shaft 26.

From the foregoing it will be understood that when the collar 29 is shifted rearwardly from its neutral position (shown in Fig. 1) it will connect the shaft 16 directly with the shaft 26 through the clutch-like coupling 30—31, and that when the collar 29 is shifted forwardly from its neutral position it will connect said shafts together in reverse under a multiplication of torque through the gears 32, 33, 34, 37 and 38.

The collar 29 is adapted to be shifted either forwardly or rearwardly from its neutral position by means of a shifting yoke 39. The yoke 39 engages within a groove 40 in the collar 29 and is slidably mounted on a rod 41 located within the casing 22. The yoke is shifted from a point exteriorly of the casing by a transversely disposed rock shaft 42, which shaft is provided on the inside of the casing with a short lever arm 43 which is pivotally connected at its free upper end with the yoke 39 by a pin 44. The yoke 39 is yieldably indexed in its neutral, reverse and forward positions by a spring pressed detent 45 which is carried by the yoke and engages within annular positioning grooves 46, 47 and 48 formed in the surface of the rod 41.

The tubular shaft 18 is provided at its rear end with a gear 49 which meshes with a gear 50 formed on the front end of the previously mentioned hub 35. This connection enables the shaft 18 to drive the shaft 26 in a forward direction through the low gear ratio provided by the gears 49, 50, 37 and 38.

The driven clutch plates 15 and 17 of the clutches 13 and 14 are located in a circular recess 51 which is formed in the rear face of the flywheel 12. The recess 51 is closed at its rear end by a centrally apertured cover plate 52 which is secured by screws 53 to the outer periphery of the flywheel. An annular casing 54 is secured by screws 55 to the inner periphery of the cover plate 52 and extends rearwardly about the shaft 18 to a point adjacent the partition 21. The rear end 56 of the casing 54 is reduced in diameter and fits snugly but rotatably within a second stationary casing 57 which is secured at its rear end to the partition 21.

The casing 54 contains two sets of forwardly opening hydraulic cylinders 59, which cylinders are of substantial axial length and arranged in a circle in equally spaced relation to each other. The cylinders are divided into two sets, preferably of three cylinders each, with the cylinders in one set alternating with the cylinders in the other set. The cylinders 59 contain closely fitting pistons 60 which are provided with cup-shaped packings 61. The pistons in one set of the cylinders 59 engage with the inner ends of certain levers 63 which operate the clutch 14, while the pistons in the other set of cylinders (not shown) engage with the inner ends of another set of levers (not shown) which operate the clutch 13. In the neutral position of the dual clutch mechanism (see Fig. 1) all of the pistons 60 are disposed at approximately their half-way points in the respective sets of cylinders.

The two sets of levers, which extend into the front ends of the cylinders through slots in the outer sides of the latter, operate the clutches 13 and 14 through an annular pressure plate 64, which pressure plate is located between the clutch plates 15 and 17 in the recess 51 in the flywheel 12. The pressure plate 64 is shiftable axially but is held against rotation relative to the flywheel by two sets of studs 66 on the outer periphery of the pressure plate, which studs project rearwardly through circumferentially interlocking apertures in the cover plate 52. The studs 66 in one of the sets referred to coact with the levers 63 of one set of levers, while the studs in the other set coact respectively with the other set of levers 63. In the neutral position of the dual clutch mechanism the pressure plate 64 is maintained free from frictional engagement with both of the clutch plates 15 and 17 by an equalizing means which is generally designated 67. These means, as well as other details of the hydraulic clutch control mechanism, are fully described in my patent identified above, to which reference may be made for further details. It suffices to state that the respective sets of levers 63 are fulcrumed and operatively connected to pressure plate 64 and pistons 60 in such manner that one thereof is actuated to shift the pressure plate and engage clutch 13 when one set of cylinders 59 is pressurized, while the other set of levers is actuated to shift plate 64 in the opposite direction and thus engage clutch 14, when the other set of cylinders is pressurized.

A hydraulic pump and single valve arrangement by which the respective sets of cylinders are selectively pressurized is also fully disclosed and described in Patent 2,485,688, hence further reference thereto is omitted here.

Passing to the rear unit 11 of the transmission—which unit may be used in conjunction with the front unit 10—this unit is mounted in a separate casing 126 (see Fig. 2). It includes an upper shaft 127 which is journaled adjacent its front end in a bearing 128 and adjacent its rear end in a bearing 129. The shaft 127 is arranged in axial alignment with the output shaft 26 of the front unit 10 and is connected directly with the latter, preferably by a flexible coupling 130. A small gear 131 is secured to the front portion of the shaft 127, and a relatively large gear 132 is secured to the rear portion of the shaft 127.

Another shaft 133 is located in the casing 126, below and parallel to the shaft 127. This lower shaft is journaled at its front end in a bearing 134 and is journaled adjacent its rear end in a bearing 135. The rear end of the shaft 133 is provided with a beveled pinion 136 which meshes laterally with a relatively large bevel gear (not shown) connected with the load. A sleeve 137 is secured to the shaft 133 and is provided intermediate its ends with an annular enlargement 138 having radially projecting clutch teeth 139. A collar 140 having complementary clutch teeth 141 on its inner periphery is mounted on the enlargement 138 for axially shiftable but non-rotatable engagement with the same.

A relatively large gear 142 is journaled on the front portion of the sleeve 137, in mesh with the gear 131 on the shaft 127. The gear 142 is provided adjacent the enlargement 138 with radially projecting clutch teeth 143 of the same size and spacing as the teeth 139 on the sleeve 137. When the collar 140 is shifted forwardly from its neutral position (shown in Fig. 2) the teeth 141 on the inside of the collar will bridge the teeth 139 and 143 and will clutch the gear 142 to the shaft 133.

A second relatively small gear 144 is journaled on the rear portion of the sleeve 137 in mesh with the gear 132 on the shaft 127. The gear 144 is also provided with radially projecting clutch teeth 145. When the collar 140 is shifted rearwardly from its neutral position the teeth 141 will bridge the teeth 139 and 145 and will clutch the gear 144 to the shaft 133.

The collar 140 can be shifted axially from its neutral position into either its forward position or its rearward position by a swinging yoke 146 which is secured to a rock shaft 147 journaled in one side of the casing 126. The shaft 147 extends to the outside of the casing and is provided there with an operating lever (not shown). The yoke 146 is indexed in each of its three different operating positions by means of an exteriorly accessible spring pressed plunger 148 which is mounted in the casing and projects inwardly into resiliently yieldable engagement with centering recesses 149, 150 and 151 formed in an opposing portion of the yoke 146.

The upper shaft 127 may be provided, if desired, with a power take-off shaft 152. This shaft, which may be used for any purpose desired, is releasably connected with the rear end of the shaft 127 by an axially shiftable clutch collar assembly 153.

The hydraulic dual clutch assembly shown and described, employing a single automatically centralized pressure plate for both clutches, actuated by two oppositely moving sets of pistons, and controlled by a single fluid directing valve, permits the associated transmission to be shifted instantly from one gear to another, without loss of torque. For bulldozing work, for which the dual clutch control is well suited, the gear ratios in the transmission are preferably so constructed as to give a faster speed in reverse than in low-low forward. When the collar 29 is moved forwardly into its reversing position actuation of the clutch 14 will drive the transmission forwardly at a very slow crawler speed under a high multiplication of torque, and actuation of the clutch 13 will drive the transmission rearwardly at a relatively fast speed. This enables the operator, by merely alternating the position of the control valve, to make short quickly repeated advances against the material or obstruction being worked on.

It will be noted that the various shafts in the transmission are so mounted in their bearings as to effect a floating arrangement of the same. This arrangement in large measure eliminates strains within the transmission resulting from loading and heating, facilitates assembling and disassembling, and reduces production costs. The shaft 16 is supported at its rear end in the sleeve 23, while the concentrically associated tubular shaft 18 supports the front end of the sleeve 23 and is in turn supported in the vertical partition 21 of the casing. Of the two bearings supporting each shaft, one is fixed against axial movement while the other is capable of some axial movement, whereby to compensate for endwise expansion and contraction of the shafts. For the shaft 16, for instance, the bearing 25 is fixed while the bearing 19 is shiftable axially relative to the shaft; for the shaft 18, the bearing 20 is fixed while the bearing 24 is shiftable; and for the shaft 26, the bearing 27 is fixed while the bearing 28 is shiftable. The same is true of the shafts in the rear unit 11, the bearings 128 and 134 being fixed and the bearings 129 and 135 being shiftable in their mountings.

The two unit transmission will give four speeds in forward and two in reverse. The lowest forward gear ratio will be obtained by letting in clutch 14, with the shifting collar 29 in its rearwardly clutched position and the shifting collar 140 in its forwardly clutched position. Second is immediately obtained by letting in clutch 13, with collar 29 still in its rearwardly clutched position. Third is then obtained by momentarily neutralizing clutch 13, shifting collar 140 into its rearwardly clutched position, and letting in clutch 14. Fourth is then obtained by letting in clutch 13. It will of course be understood that any suitable gear shifting linkage can be connected up with the shifting devices 39 and 146 under the control of a single lever to properly coordinate the operation of those devices.

In Figs. 3 and 4 a modified single unit multiple speed transmission of novel construction is shown. This transmission is equipped with a hydraulically operated dual clutch control of the same construction as that illustrated in Fig. 1. Only the clutch driven plates 154 and 155 of the two clutches are shown in connection with this structure, the other parts being omitted for clearness. This modified transmission is housed within a casing 156. The driven plate 154 is shiftably splined to the front end of a shaft 157, while the driven plate 155 is shiftably splined to the front end of a tubular shaft 158 which surrounds the shaft 157.

The tubular shaft 158 extends rearwardly into a second tubular shaft 159 and is fixedly splined to that shaft. The shaft 159 is provided adjacent its front end with a small integral gear 160 and is provided adjacent its rear end with a relatively large integral gear 161. The front end of the shaft 159 is journaled in a bearing 162 which is mounted in the front wall 163 of the casing 156, while the rear end of the shaft 159 is journaled in a bearing 164 which is mounted in a vertical web 165 formed in the casing.

A third tubular shaft 166 extends rearwardly from the shaft 159. The front end of the shaft 166 is journaled in a bearing 167 which is mounted in the hollow rear end of the shaft 159, while the rear end of the shaft 166 is journaled in a bearing 168 which is mounted in another vertical web 169. The shaft 157 terminates in the shaft 166 adjacent the rear end of the latter and is fixedly splined to the same. A large gear 170 of somewhat larger size than the gear 161 is journaled on the shaft 166 near the rear end of the latter, and a sleeve 171 is keyed to the shaft 166 in front of the gear 170. The sleeve 171 is provided with an annular enlargement 172 having radially projecting clutch teeth 173. An axially shiftable clutch collar 174 having complementary teeth 175 on its inner periphery is sleeved over the enlargement 172 in circumferentially interlocked engagement with the latter. The gear 170 is provided adjacent the enlargement 172 with radially projecting teeth 176 of the same size and spacing as the teeth 173 on the enlargement. When the clutch collar 173 is shifted rearwardly from its neutral position (shown in Fig. 3) the teeth 175 on the inside of the same will bridge the teeth 173 and 176, clutching the gear 170 to the shaft 166. A relatively small gear 177 of somewhat larger size than the gear 160 is journaled on the sleeve 171 in front of the enlargement 172 and is provided adjacent the enlargement with radially projecting teeth 178 of the same size and spacing as the teeth 173 and 176. When the clutch collar 174 is shifted forwardly from its neutral position the teeth 175 on the inside of the same will bridge the teeth 173 and 178, clutching the gear 177 to the shaft 166.

A shaft 179—which constitutes the output shaft of the transmission—extends rearwardly from the third tubular shaft 166. The front end of the shaft 179 is journaled in a bearing 180 which is mounted in the hollow rear end of the shaft 166, while the rear end of the shaft 179 is journaled in a bearing 181 which is mounted in the rear wall 182 of the casing. A large gear 183 is shiftably splined on the shaft 179 and is provided with a forwardly extending hub 184 having radially projecting clutch teeth 185. The hollow rear end of the shaft 166 is enlarged and formed into a rearwardly extending annular flange 186. The flange 186 is provided on its inner periphery with clutch teeth 187 which are complementary to the clutch teeth 185 on the hub 184 of the gear 183. When the gear 183 is shifted forwardly along the shaft 179 the teeth 185 will interlock circumferentially with the teeth 187, clutching the shaft 179 directly to the shaft 166.

The two gears 160 and 161 on the tubular shaft 159 mesh respectively with two gears 188 and 189 which are journaled below the gears 160 and 161 on a sleeve 190. The sleeve 190 is fixedly splined to a jack shaft 191. The front end of the shaft 191 is journaled in a bearing 192 which is mounted in the lower portion of the front wall 163 of the casing, while the rear end of the shaft 191 is journaled in a bearing 193 which is mounted in the lower portion of the vertical web 165.

The sleeve 190 is provided intermediate the gears 188 and 189 with an annular enlargement 194 having radially projecting clutch teeth 195, and the hubs of the gears 188 and 189 are provided with similar clutch teeth 196 and 197. An axially shiftable clutch collar 198 having complementary teeth 199 on its inner periphery is sleeved over the enlargement 194 in circumferentially interlocked engagement with the latter. When shifted forwardly from its neutral position the collar 198 clutches the gear 188 to the shaft 191, and when shifted rearwardly from its neutral position it clutches the gear 189 to the shaft 191.

A second jack shaft 200 extends rearwardly from the shaft 191. The rear end of the shaft 191 contains a pilot recess 201 and the front end of the shaft 200 is provided with a ball tip 202 which is supported in the recess 201. The rear end of the shaft 200 is journaled in a bearing 203 which is mounted in the lower portion of the rear wall 182 of the casing. The gear 177 meshes downwardly with a gear 204 which is keyed to the shaft 200. The gear 204 is also connected with a radial flange 205 on the rear end of the shaft 191 by means of an axially separable but circumferentially interlocking spline connection 206.

The shaft 200 is provided with three integrally formed gears 207, 208 and 209 of progressively smaller size. The gear 170 meshes downwardly with the gear 207. The gear 209 meshes upwardly with the gear 183 when the latter is shifted rearwardly into the plane of the gear 209. The gear 208 meshes laterally with a reversing gear 210 (see Fig. 4) which is secured to the front end of a short countershaft 211. The shaft 211 is journaled in the casing at one side of the shaft 200. A gear 212 is shiftably splined on the shaft 211. When the gear 212 is shifted rearwardly into the plane of the gear 183, in the forwardly disconnected position of the latter, it will mesh with the gear 183 and establish a reverse drive between the shaft 200 and the shaft 179.

As in the transmission first described, the bearings in which the various shafts are mounted are so constructed and arranged as to compensate effectively for the endwise expansion and contraction occasioned by heating and load transmitting conditions. The shafts 157 and 158 are floatingly mounted relative to each other. The inner bearing 180 for the rear end of the sleeve 166 in which the shaft 157 is splined is shiftable axially between the sleeve and the shaft 179, and the inner bearing 167 for the rear end of the sleeve 159 in which the shaft 158 is secured is likewise shiftable axially between that sleeve and the sleeve 166. The end bearings 162 and 181 are fixed in the casing, while the intermediate bearings 164 and 168, although fixed with respect to the casing are shiftable with respect to the sleeves 159 and 166. The same is true of the bearings for the lower shaft sections 191 and 200. The bearing 192 for the front section 191 is fixed while the bearing 193 for that section is shiftable relative to the casing. Likewise, the bearing 203 for the rear section 200 is fixed while the pilot bearing 202 is shiftable.

The universal drive connection effected between the two shaft sections 191 and 200 by the introduction of the pilot bearing 202 and the separable clutch 206 permits of the intermediate bearing support 193 without setting up any bearing stresses and greatly facilitates manufacture and assembly.

What I claim is:

1. In a multiple speed transmission, two concentrically arranged driving shafts, selectively controlled means for driving one or the other of the driving shafts, a driven shaft positioned in axial alignment with the driving shafts, means for selectively connecting one of the driving shafts for selectively connecting the same to the driven shaft either directly or in reverse, and means for connecting the other driving shaft to the driven shaft under a reduction, said first named means comprising a sleeve secured to and surrounding the inner driving shaft and journaled at axially spaced points by the outer driving shaft and driven shaft respectively.

2. In a multiple speed transmission, two concentrically arranged driving shafts, selectively controlled means for driving one or the other of the driving shafts, a driven shaft positioned in axial alignment with the driving shafts, means for selectively connecting one of the driving shafts to the driven shaft either directly or in reverse, and means for connecting the other driving shaft to the driven shaft under a reduction, said first named means comprising a sleeve secured to and surrounding the inner driving shaft and internally journaled at its opposite ends in the outer driving shaft and driven shaft respectively.

3. In a multiple speed transmission, two concentrically arranged driving shafts, selectively controlled means for driving one or the other of the driving shafts, a driven shaft positioned in axial alignment with the driving shafts, means for selectively connecting one of the driving shafts to the driven shaft either directly or in reverse, and means for connecting the other driving shaft to the driven shaft under a reduction, said first named means comprising a sleeve secured to the inner driving shaft and supporting the same for rotation, and bearings rotatively journaling said sleeve at axially spaced points on the outer driving shaft and driven shaft respectively, at least one of said bearings being an axially shiftable one, a reverse driving unit, a member splined on said sleeve and provided with elements selectively engageable with said driven shaft and reverse driving unit respectively to drive the same, and means to shift said member axially on said sleeve for said respective selective engagements.

4. In a multiple speed transmission, two concentrically arranged driving shafts, selectively controlled means for driving one or the other of the driving shafts, a driven shaft positioned in axial alignment with the driving shafts, means for selectively connecting one of the driving shafts to the driven shaft either directly or in reverse, and means for connecting the other driving shaft to the driven shaft under a reduction, said first named means comprising a sleeve secured to the inner driving shaft, and bearings rotatively journaling said sleeve at axially spaced points on the outer driving shaft and driven shaft respectively, a reverse driving unit, a member splined on said sleeve and provided with elements selectively engageable with said driven shaft and reverse driving unit respectively to drive the same, and means to shift said member axially on said sleeve for said respective selective engagements.

5. In a multiple speed dual clutch transmission, two selectively operable clutches, two concentrically associated driving shafts connected at their front ends with said clutches, a driven shaft in axial alignment with the driving shafts, a collar in rotatively fixed, axially slidable relation to the rear end of the inner driving shaft, a clutch associated with the collar for connecting the inner driving shaft to the driven shaft in a 1:1 drive when the collar is shifted rearwardly, a gear on the front end of the driven shaft, a countershaft, a gear on the countershaft in mesh with the gear on the driven shaft, two other gears on the countershaft, a gear associated with the collar for rotating one of the two last mentioned gears in reverse when the collar is shifted forwardly, whereby to drive the driven shaft in reverse, and a gear on the rear end of the outer driving shaft in mesh with the remaining gear on the countershaft for driving the driven shaft forwardly under a multiplication of torque.

6. A multiple speed transmission comprising two concentrically arranged driving shafts, two friction clutches operatively connected to said shafts for selectively coupling one or the other thereof with an associated rotary device, a driven shaft positioned in axial alignment with said driving shafts, gears fixed on said driven shaft and one of the driving shafts, countershaft gears including a reversing gear and gears in constant mesh with said respective driven and driving shaft gears, a reversing idler gear meshing with said countershaft reversing gear, and a selector gear in concentric, rotatively fixed relation to the other driving shaft, said selector gear being axially shiftable relative to said last named shaft for meshing engagement with said idler gear and being provided with means to drivingly engage said driven shaft gear upon axial shifting relative to the latter.

7. A multiple speed transmission comprising two concentrically arranged driving shafts, two friction clutches operatively connected to said shafts for selectively coupling one or the other thereof with an associated rotary device, a driven shaft positioned in axial alignment with said driving shafts, gears fixed on said driven shaft and the outer driving shaft, countershaft gears including a reversing gear and gears in constant mesh with said respective driven and driving shaft gears, a reversing idler gear meshing with said countershaft reversing gear, and a selector gear in concentric rotatively fixed relation to the inner driving shaft, said selector gear being axially shiftable relative to said last named shaft for meshing engagement with said idler gear and being provided with means to drivingly engage said driven shaft gear upon axial shifting relative to the latter.

8. A multiple speed transmission comprising two concentrically arranged driving shafts, two friction clutches operatively connected to said shafts for selectively coupling one or the other thereof with an associated rotary device, a driven shaft positioned in axial alignment with said driving shafts, gears fixed on said driven shaft and one of the driving shafts, countershaft gears including a reversing gear and gears in constant mesh with said respective driven and driving shaft gears, a reversing idler gear meshing with said countershaft reversing gear, and a selector gear in concentric rotatively fixed relation to the other driving shaft, said selector gear being axially shiftable relative to said last named shaft for meshing engagement with said idler gear and being provided with means to drivingly engage said driven shaft gear upon axial shifting relative to the latter, the pitch diameter of the countershaft gear meshing with said first named driving shaft gear exceeding that of said countershaft reversing gear, whereby selective operation of said clutches when said reversing idler gear is driven will rotate said driven shaft forwardly at slow speed and multiplied torque or backwardly at greater speed and less torque.

9. A transmission in accordance with claim 7 in which said inner driving shaft has a sleeve fixed thereon on which said selector gear is mounted for relatively non-rotative axial sliding movement.

10. A transmission in accordance with claim 7 in which said inner driving shaft has a sleeve fixed thereon on which said selector gear is mounted for relatively non-rotative, axial sliding movement, said sleeve being journalled for rotation by said outer driving shaft and said driven shafts, respectively.

OSCAR H. BANKER.

References Cited in the file of this patent
UNITED STATES PATENTS

| Number | Name | Date |
| --- | --- | --- |
| 1,705,032 | Short | Mar. 12, 1929 |
| 2,098,716 | Budlong | Nov. 9, 1937 |
| 2,174,259 | Feerick et al. | Sept. 26, 1939 |
| 2,232,159 | Blood | Feb. 18, 1941 |
| 2,386,541 | Campodonico | Oct. 9, 1945 |
| 2,599,801 | Youngren et al. | June 10, 1952 |